US009104446B2

(12) United States Patent
Yukawa et al.

(10) Patent No.: US 9,104,446 B2
(45) Date of Patent: Aug. 11, 2015

(54) BROADCAST RECEIVING APPARATUS WHICH PERFORMS START-UP PROCESSING USING SOFTWARE DATA CONFIRMED TO BE INITIAL-STATE SOFTWARE DATA BY COMPARING VERSIONS IN STORAGE DEVICES

(71) Applicants: Jun Yukawa, Tokyo (JP); Satoru Tokuyama, Tokyo (JP); Kensuke Ueda, Tokyo (JP); Satoko Miki, Tokyo (JP)

(72) Inventors: Jun Yukawa, Tokyo (JP); Satoru Tokuyama, Tokyo (JP); Kensuke Ueda, Tokyo (JP); Satoko Miki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 392 days.

(21) Appl. No.: 13/669,201

(22) Filed: Nov. 5, 2012

(65) Prior Publication Data

US 2013/0139212 A1   May 30, 2013

(30) Foreign Application Priority Data

Nov. 30, 2011  (JP) ................. 2011-261878
May 14, 2012  (JP) ................. 2012-110529

(51) Int. Cl.
*G06F 9/00* (2006.01)
*G06F 9/455* (2006.01)
*H04N 21/443* (2011.01)

(52) U.S. Cl.
CPC .............. *G06F 9/455* (2013.01); *H04N 21/443* (2013.01)

(58) Field of Classification Search
CPC ....................................................... G06F 9/455

USPC ...................................................... 713/2, 100
See application file for complete search history.

(56) References Cited

U.S. PATENT DOCUMENTS

| 6,226,740 | B1 * | 5/2001 | Iga .................................... 713/2 |
| 6,662,267 | B2 * | 12/2003 | Stewart ......................... 711/113 |
| 6,704,840 | B2 * | 3/2004 | Nalawadi et al. ............. 711/118 |
| 7,107,407 | B2 | 9/2006 | Kato et al. |
| 7,979,687 | B2 | 7/2011 | Miyajima |
| 8,099,589 | B2 * | 1/2012 | Choo ................................ 713/2 |
| 8,117,490 | B2 * | 2/2012 | Haller .......................... 714/6.11 |
| 2010/0100675 | A1 * | 4/2010 | Furuhjelm ..................... 711/113 |

FOREIGN PATENT DOCUMENTS

| JP | 2003-36173 A | 2/2003 |
| JP | 2004-152277 A | 5/2004 |
| JP | 2005-11120 A | 1/2005 |
| JP | 2006-23816 A | 1/2006 |

(Continued)

*Primary Examiner* — Chun Cao
(74) *Attorney, Agent, or Firm* — Birch, Stewart, Kolasch & Birch, LLP

(57) ABSTRACT

An apparatus using a software start-up method, selects execution-targeted software data to be used for starting execution of the start-up processing, out of software data stored in a first storage device; starts the execution of the start-up processing by using the execution-targeted software data; searches for another software data other than the execution-targeted software data, from software data stored in the first storage device; determines whether the another software data is changed from its initial-state; and, if the another software data is changed, selects initial-state software data as the initial state of the another software data from said at least one software data stored in a second storage device, reads the initial-state software data from the second storage device, and replaces the another software data stored in the first storage device with the read initial-state software data by overwriting.

12 Claims, 8 Drawing Sheets

(56) References Cited

FOREIGN PATENT DOCUMENTS

| JP | 2006-277472 A | 10/2006 |
| JP | 2008-9742 A | 1/2008 |
| JP | 2008-97105 A | 4/2008 |
| JP | 2011-145933 A | 7/2011 |

* cited by examiner

BROADCAST RECEIVING APPARATUS WHICH PERFORMS START-UP PROCESSING USING SOFTWARE DATA CONFIRMED TO BE INITIAL-STATE SOFTWARE DATA BY COMPARING VERSIONS IN STORAGE DEVICES

BACKGROUND OF THE INVENTION

1. Field of the Invention

The present invention relates to an information processing apparatus, a broadcast receiving apparatus and a software start-up method.

2. Description of the Related Art

In digital broadcasting, in order to provide various services, additional information for an additional function such as two-way interactive function based on data broadcasting that distributes text information and still pictures and input information supplied from viewers are transmitted in addition to video information and audio information. Application programs to be used for realizing these services are designed so as to have higher functions and more various functions in comparison with conventional ones. Moreover, a typical broadcast receiving apparatus uses a general-purpose operating system (OS) which is adopted for executing application programs. Furthermore, in the present application, 'software' is used as a generic term for programs such as an OS and an application program, and 'software data' is used as electronic data describing software.

In an information processing apparatus which receives a broadcast, a CPU (Central Process Unit) loads software data corresponding to services unique to digital broadcasting into a working RAM (Random Access Memory) to execute software. There are two types of RAMs: a volatile RAM in which stored electronic data are lost when the power supply is interrupted, and a non-volatile RAM which keeps holding stored electronic data even when the power supply is interrupted. An example of volatile RAMs is a DRAM (Dynamic Random Access Memory), and an example of non-volatile RAMs is an MRAM (Magnetic Random Access Memory). Further, although an SRAM (Static Random Access Memory) is a volatile RAM, a combination of an SRAM and an auxiliary power source can be used as a non-volatile storage device. Likewise, although a DRAM is a volatile RAM, a combination of a DRAM and an auxiliary power source can be used as a non-volatile storage device.

The conventional information processing apparatus uses an inexpensive volatile RAM and an expensive non-volatile flash memory, and transfers software data from the flash memory to the volatile RAM when the apparatus is started up. However, since the transfer processing of the software data requires long time, the conventional information processing apparatus needs long waiting time from when the power of the apparatus is turned on until start-up processing is completed.

In order to resolve such a situation, for example, Japanese Patent Kokai Publication No. 2008-097105 (Patent Document 1) proposes an apparatus which is configured to store software data read by a CPU when the apparatus is started up in a start-up volatile RAM offering a high data transfer rate, and which is continuously supplied with power from an auxiliary power source, instead of in a flash memory offering a low data transfer rate, so that the CPU reads the software data from a volatile RAM for the start-up processing when the apparatus is started up.

Furthermore, a technique to reduce the transfer processing of the software data by using a non-volatile RAM instead of a volatile RAM is proposed as another solution. For example, Japanese Patent Kokai Publication No. 2005-011120 (Patent Document 2) proposes an apparatus that discriminates software data between data to be rewritten while the apparatus is in operation and data not to be rewritten while the apparatus is in operation, and stores the data to be rewritten while the apparatus is in operation in a non-volatile RAM, thereby reducing the transfer processing of the software data when the apparatus is started up.

However, the conventional information processing apparatus includes, in addition to the CPU and the RAM, a hardware device such as a DSP (Digital Signal Processer), which is operated by software other than software operated by the CPU. For this reason, the RAM stores various software data including software data for DSP. In general, the software data for DSP cannot be managed by the software operated by the CPU and how the software data for DSP is rewritten cannot be known through the software operated by the CPU. Accordingly, a conventional broadcast receiving apparatus is required to perform initialization sequence processing according to operation of a hardware device such as the DSP after the power of the apparatus is turned on. However, even if the software data for DSP is stored in a non-volatile RAM when the apparatus is started up, the software data for DSP is rewritten while the apparatus is in operation in some cases. If the software data for DSP stored in the non-volatile RAM has been rewritten, it cannot coordinate with the operation of the hardware device when the power of the apparatus is turned on, and the hardware device such as the DSP does not normally work when the power of the apparatus is turned on again after the power of the apparatus is turned off.

Moreover, as to the information processing apparatus which receives a broadcast such as a TV broadcast, a user sometimes unintentionally pulls out a power-source cable of the apparatus from a power-source plug. Because, even if a non-volatile RAM is used instead of a volatile RAM, data in the non-volatile RAM immediately before the power of the apparatus is interrupted is in a state where various processing are unfinished, there is a problem that software processing cannot be performed when the power of the apparatus is recovered. Further, there is another problem that: when the power of the apparatus is turned on again while the data in the non-volatile RAM immediately before the power of the apparatus is interrupted is in a state where processing which is performed on the assumption that hardware initialization processing is performed is unfinished, data of the non-volatile RAM does not agree with one before the power interruption because hardware initialization processing is not completed. Therefore, the apparatus cannot be started up by using content of the non-volatile RAM as it is.

If the problems described above occur, the transferring processing of the software data to a RAM from a storage device offering a low data transfer rate is performed as emergency recovery processing. The transfer processing takes much time, and besides, processing of determining to start recovery processing requires time. Accordingly, there is a problem that it takes much more time to start up the information processing apparatus.

SUMMARY OF THE INVENTION

The object of the present invention is to provide an information processing apparatus, a broadcast receiving apparatus and a software start-up method capable of reducing waiting time from when the power of the apparatus is turned on until a predetermined function becomes executable.

According to an aspect of the present invention, an information processing apparatus includes: a first storage device as a non-volatile storage device being capable of storing a plurality of items of software data to be used when execution of start-up processing of the apparatus is started, the plurality of items of software, data being capable of being read from and written in the first storage device; a second storage device as a non-volatile storage device offering a second data transfer rate not higher than a first data transfer rate offered by the first storage device, the second storage device storing at least one of the plurality of items of software data; an operation input device; and a main controller controlling operation of the first storage device and the second storage device, the main controller including a software data selector which selects any of the plurality of items of software data and a software data change determiner which determines whether or not there is a change in the plurality of items of software data; wherein, according to instructions from the operation input device, the software data selector selects execution-targeted software data which is used for starting execution of the start-up processing, out of the plurality of items of software data stored in the first storage device, the main controller starts execution of the start-up processing by using the execution-targeted software data, the software data selector searches for another software data other than the execution-targeted software data which has been used for the starting of execution of the start-up processing, from the plurality of items of software data stored in the first storage device, the software data change determiner determines whether or not the another software data which has been searched out as a result of the searching is changed from an initial-state of the another software data, and if the another software data is changed from the initial-state software data, the software data selector selects initial-state software data as the initial state of the another software data from said at least one software data stored in the second storage device, reads the initial-state software data from the second storage device, and replaces the another software data stored in the first storage device with the read initial-state software data by overwriting.

According to another aspect of the present invention, a software start-up method for an apparatus including a first storage device as a non-volatile storage device being capable of storing a plurality of items of software data to be used when execution of start-up processing of the apparatus is started; and a second storage device as a non-volatile storage device offering a second data transfer rate not higher than a first data transfer rate offered by the first storage device, the second storage device storing at least one of the plurality of items of software data; the method includes the steps of: selecting execution-targeted software data which is used for starting execution of the start-up processing, out of the plurality of items of software data stored in the first storage device; starting execution of the start-up processing by using the execution-targeted software data; searching for another software data other than the execution-targeted software data which has been used for the starting of execution of the start-up processing, from the plurality of items of software data stored in the first storage device; determining whether or not the another software data which has been searched out as a result of the searching is changed from an initial-state of the another software data; and if the another software data is changed from the initial-state software data, selecting initial-state software data as the initial state of the another software data from said at least one software data stored in the second storage device, reading the initial-state software data from the second storage device, and replacing the another software data stored in the first storage device with the read initial-state software data by overwriting.

According to the present invention, an advantageous effect can be achieved that it is possible to reduce waiting time from when the power of the apparatus is turned on until a predetermined function becomes executable.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the

DETAILED DESCRIPTION

First Embodiment

Figure 1:
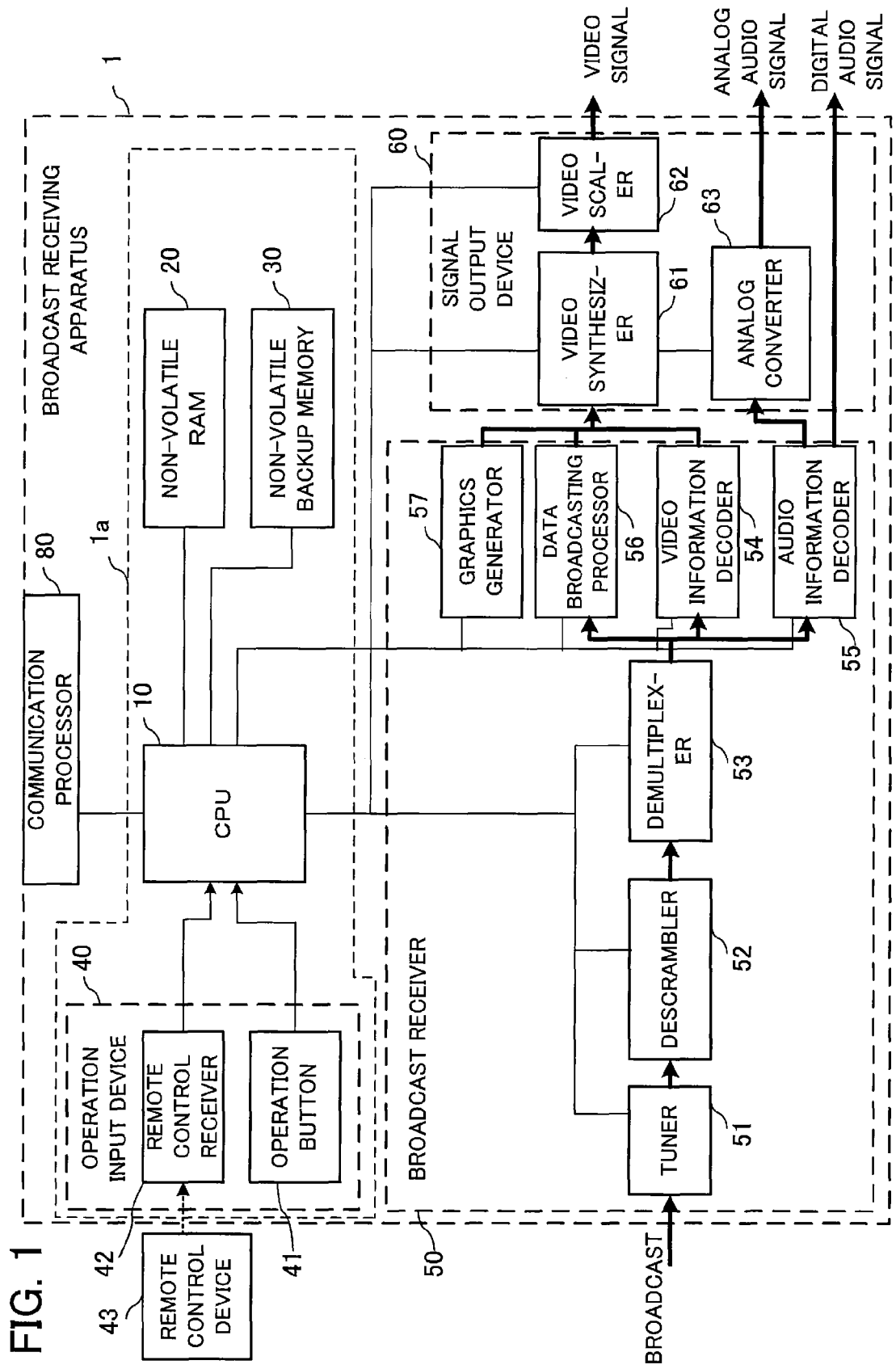
FIG. 1 is a block diagram schematically illustrating an example of a configuration of a broadcast receiving apparatus according to a first embodiment of the present invention.

FIG. 1 is a block diagram schematically illustrating a specific example of a configuration of a broadcast receiving apparatus 1 which includes an information processing apparatus 1a according to a first embodiment of the present invention. As illustrated in FIG. 1, the broadcast receiving apparatus 1 according to the first embodiment includes a CPU 10 for controlling the whole of the apparatus 1; a non-volatile RAM 20 for storing software data used when software is executed; a non-volatile backup memory 30 for holding software data as backup; an operation input device 40; a broadcast receiver 50; and a signal output device 60. The broadcast receiving apparatus 1 according to the first embodiment further includes a communication processor 80 for performing communication with another apparatus. However, it is possible for the broadcast receiving apparatus 1 not to include the communication processor 80. In the configuration of the broadcast receiving apparatus 1, the CPU 10, the non-volatile RAM 20, the non-volatile backup memory 30 and the operation input device 40 constitute the information processing apparatus 1a according to the first embodiment.

The operation input device 40 includes an operation button or buttons 41 provided on a main body of the broadcast receiving apparatus 1 for inputting user instructions to the broadcast receiving apparatus 1; and a remote control receiver 42 for receiving contents of user instructions from a remote control device 43, through which user instructions is inputted. However, the configuration of the operation input device 40 is not limited to the example of FIG. 1. The operation input device 40 may have another configuration as long as the user instructions can be inputted, such as a configuration where the operation input device 40 includes only the operation button or buttons 41, another configuration in which the operation input device 40 includes only the remote control receiver 42 which receives a signal from the remote control device 43, or other configurations.

The broadcast receiver 50 includes a tuner 51 for receiving a broadcast signal to introduce it into the broadcast receiving apparatus 1; a descrambler 52 for decrypting the broadcast signal as an encrypted signal received by the tuner 51; a demultiplexer 53 for selecting a video signal, an audio signal, and an additional signal such as a data broadcast signal from the decrypted broadcast signal that has been decrypted by the descrambler 52. Further, the broadcast receiver 50 includes a video information decoder 54 for decoding the video signal selected by the demultiplexer 53 to regenerate original video information; an audio information decoder 55 for decoding the audio signal selected by the demultiplexer 53 to regenerate original audio information; a data broadcasting processor 56 which receives the data broadcast signal selected by the demultiplexer 53 to generate data broadcasting picture information; and a graphics generator 57 for generating a graphics picture for user operation displayed in the broadcast receiving apparatus 1.

The signal output device 60 includes a video synthesizer 61 which superimposes video information outputted from the data broadcasting processor 56, video information outputted from the video information decoder 54 and video information generated by the graphics generator 57 to synthesize video information; a video scaler 62 which converts the video information synthesized by the video synthesizer 61 into video information of a desired output format; and an analog converter 63 which converts digital audio information outputted from the audio information decoder 55 into an analog audio signal.

The CPU 10 controls components in the broadcast receiving apparatus 1 so that the broadcast signal supplied to the broadcast receiving apparatus 1 is decoded and the video information, audio information and additional information based on the broadcast signal are supplied to a user.

Figure 2:
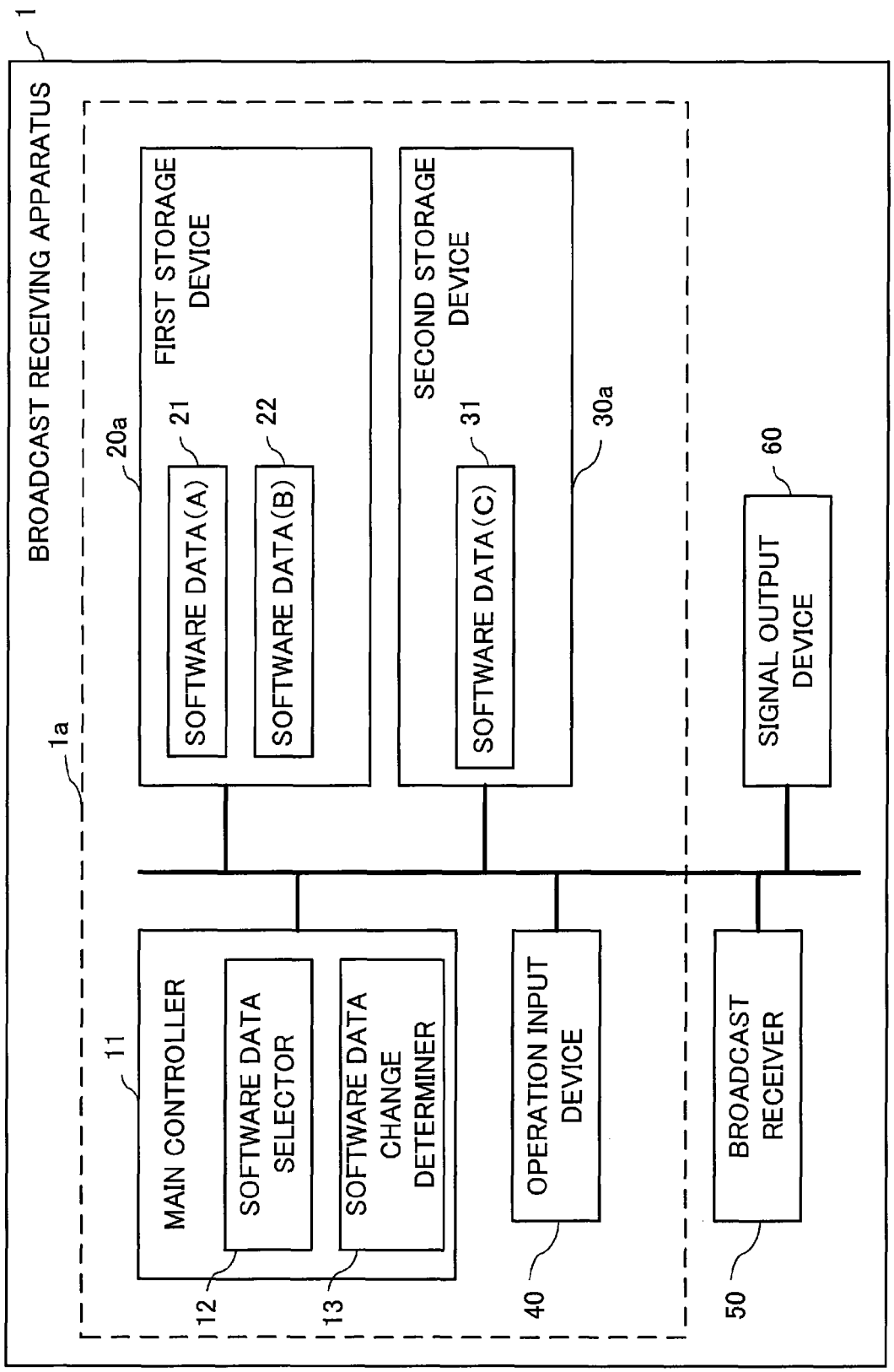
FIG. 2 is a simplified block diagram schematically illustrating a configuration of the broadcast receiving apparatus including an information processing apparatus according to the first embodiment.

FIG. 2 is a simplified block diagram schematically illustrating a configuration of the broadcast receiving apparatus 1 in FIG. 1. In FIG. 2, the non-volatile RAM 20 in FIG. 1 is depicted as a first storage device 20a, the non-volatile backup memory 30 in FIG. 1 is depicted as a second storage device 30a, and the CPU 10 which controls the whole of the broadcast receiving apparatus 1 is depicted as a main controller 11. In the configuration of the broadcast receiving apparatus 1, the main controller 11, the first storage device 20a, the second storage device 30a and the operation input device 40 constitute the information processing apparatus 1a according to the first embodiment.

The second storage device 30a in FIG. 2 may be configured by a part of the non-volatile RAM 20, for example, instead of being configured by the non-volatile backup memory 30 as illustrated in FIG. 1. In a case where the first storage device 20a and the second storage device 30a are configured by a combination of the non-volatile RAM 20 and the non-volatile backup memory 30, because a typical non-volatile backup memory 30 is inexpensive and has a large storage capacity, the broadcast receiving apparatus 1 as a whole can be realized at low cost, even if software data has a large data size. In another case where the first storage device 20a and the second storage device 30a are configured by the non-volatile RAM 20, because data can be read from the non-volatile RAM 20 at a high transfer rate, reading time of the main controller 11 can be reduced, and besides, because the number of components forming the broadcast receiving apparatus 1 is reduced, the broadcast receiving apparatus 1 can be simply designed. Accordingly, reliability of the broadcast receiving apparatus 1 can be improved.

The first storage device 20a as a non-volatile memory stores a plurality of items of software data to be used when execution of start-up processing of the broadcast receiving apparatus 1 is started, wherein the plurality of items of software data are capable of being read from and written in the first storage device 20a. In FIG. 2, the first storage device 20a stores two items of software data, i.e., software data (A) 21 and software data (B) 22.

The second storage device 30a as a non-volatile storage device stores at least one of the plurality of items of software data stored in the first storage device 20a. The second storage device 30a offers a second data transfer rate not higher than a first data transfer rate offered by the first storage device 20a. In FIG. 2, the second storage device 30a stores one item of software data, i.e., software data (C) 31. Furthermore, software data stored in the first storage device 20a and the second storage device 30a include not only software data working on the main controller 11 but also software data exclusively used in the broadcast receiver 50 or the signal output device 60.

The main controller 11 includes a software data selector 12 for selecting software data which is used for starting the execution of processing by the main controller 11 from among the software data stored in the first storage device 20a; and a software data change determiner 13 for determining whether or not there is a change in the plurality of items of software data stored in the first storage unit 20a, for example, whether or not the software data stored in the first storage device 20a is changed from its initial state.

Figure 3:
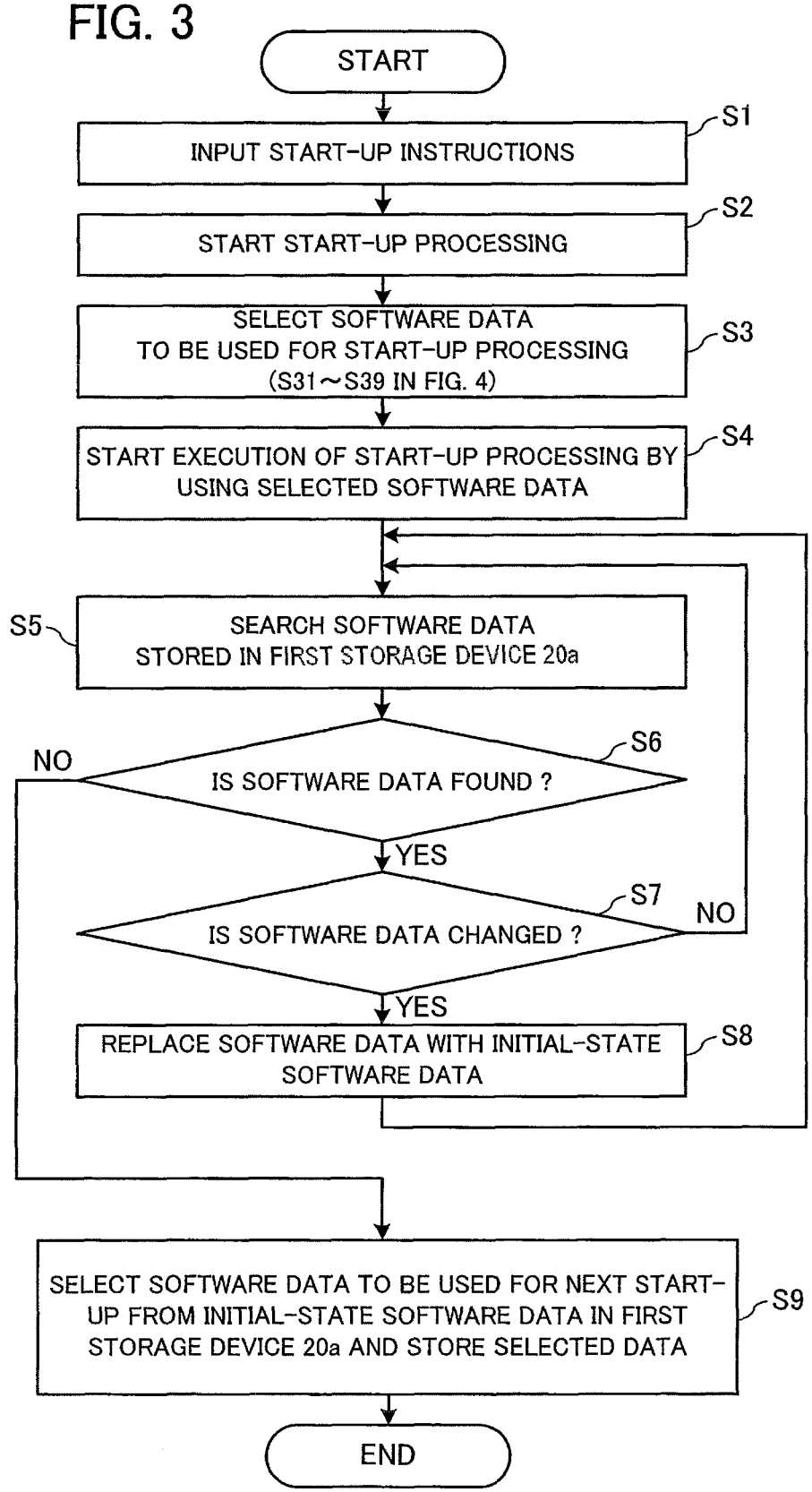
FIG. 3 is a flowchart illustrating start-up processing of a main controller in the broadcast receiving apparatus according to the first embodiment (a software start-up method according to the first embodiment)

FIG. 3 is a flowchart illustrating the start-up processing of the main controller 11 in the broadcast receiving apparatus 1 according to the first embodiment (a software start-up method according to the first embodiment).

When a user operates to turn on the power of the broadcast receiving apparatus 1, the main controller 11 receives start-up instructions inputted through the operation input device 40 by the user (step S1 in FIG. 3), and starts the start-up processing of the apparatus 1 (step S2 in FIG. 3). The operation input device 40 is realized by the operation buttons (e.g., the element 41 in FIG. 1) provided in the broadcast receiving apparatus 1 or realized by a combination of the remote control device and the remote control receiver (e.g., the elements 43 and 42 in FIG. 1), for example. Normally, the broadcast receiving apparatus 1 is in a state where the broadcast receiving apparatus 1 can receive the start-up instructions through the operation input device 40. The broadcast receiving apparatus 1 may have another controller, in addition to the main controller 11, for receiving instructions for starting the start-up processing inputted through the operation input device 40 by the user. In the following explanation, the start-up processing which is performed by an element other than the main controller 11 will not be described, but processing performed by the main controller 11 after the start-up instructions are inputted to the main controller 11 will be described.

Next, the software data selector 12 in the main controller 11 selects software data to be used for starting the execution of the start-up processing out of the software data stored in the first storage device 20a (step S3 in FIG. 3). The processing at step S3 will be explained referring to a flowchart of FIG. 4.

Figure 4:
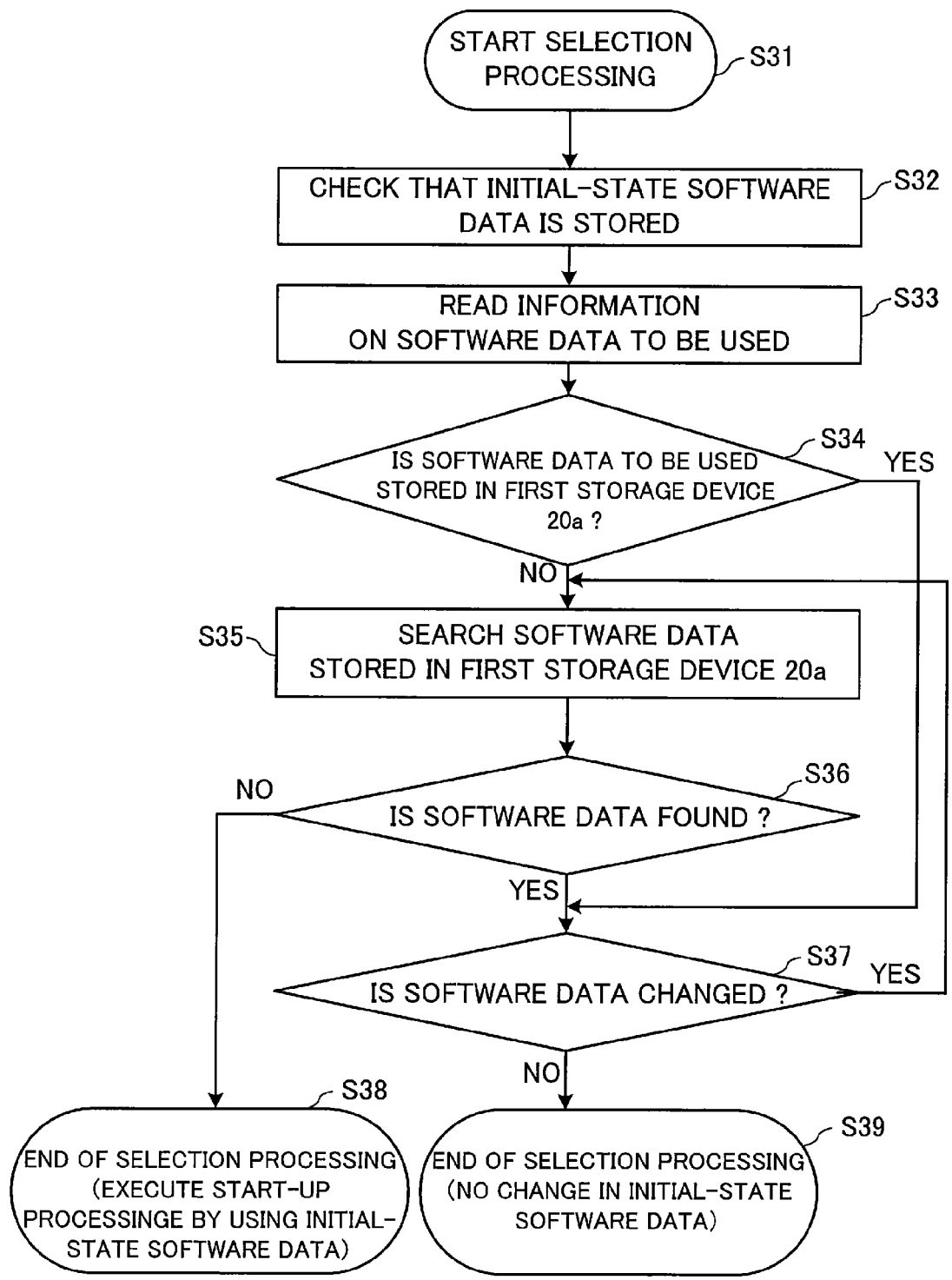
FIG. 4 is a flowchart illustrating processing by a software data selector in the broadcast receiving apparatus according to the first embodiment.

First, the software data selector 12 in the main controller 11 starts to select the software data to be used for starting the execution of the start-up processing (step S31 in FIG. 4).

Next, the software data selector 12 in the main controller 11 checks that initial-state software data is stored in the second storage device 30a (step S32 in FIG. 4). Here, a case where the initial-state software data (C) 31 is stored in the second storage device 30a illustrated in FIG. 2 will be explained. If no initial-state software data can be identified at step S32 due to some causes, the broadcast receiving apparatus 1 fails to start up.

Next, the software data selector 12 in the main controller 11 reads, from a storage device, information on the software data to be used, e.g., information indicating the software data to be used and where it is stored. The information on the software data to be used may be stored in a part of the first storage device 20a or may be stored in a storage device of another apparatus and obtained through the communication processor of the broadcast receiving apparatus 1 (e.g., the element 80 in FIG. 1). In this example, the information on the software data to be used indicates that the software data to be used is the software data (A) 21 out of the software data stored in the first storage device 20a.

Next, the software data selector 12 in the main controller 11 determines whether or not the software data (A) 21 to be used for the execution of the start-up processing (i.e., execution-targeted software data which is used for starting the execution of the start-up processing) is stored in the first storage device 20a (step S34 in FIG. 4).

If it is determined at step S34 that the execution-targeted software data is stored in the first storage device 20a, the software data change determiner 13 in the main controller 11 determines whether or not the software data (A) 21 is changed from its initial state (step S37 in FIG. 4). If there is no change from its initial state, the software data change determiner 13 informs the main controller 11 that the software data (A) 21 is used for starting the execution of the start-up processing (step S39 in FIG. 4). Here, the processing that the software data change determiner 13 determines whether or not there is a change from its initial state may be performed by comparing the whole of the software data (A) 21 and the whole of the initial-state software data (C) 31 and determining whether there is any difference between them. Alternatively, the processing that the software data change determiner 13 determines whether or not there is a change from its initial state may be performed by storing, in the first storage device 20a, flag information indicating that it is started up by using the software data (A) 21 at the time of starting of the execution of the start-up processing of step S4 in FIG. 3 and by determining that there is a change based on the flag information. In the latter case, there is an advantage that the determination processing by the software data change determiner 13 can be completed in a short time, even if the software data has a large data size.

If it is determined at step S34 that the execution-targeted software data is not stored in the first storage device 20a, or if it is determined at step S37 that the execution-targeted software data is changed from its initial state, the main controller 11 determines that the start-up processing cannot be started based on the stored information and searches for substitute software data (step S35 in FIG. 4). In normal processing, at step S9 in FIG. 3 described below, it is confirmed that software data to be used for starting the execution of the next start-up processing is not changed from its initial state and information on the confirmation is stored, and so step S35 is rarely implemented. However, if the power supply is interrupted during the start-up processing and before the processing of step S9 is performed, or if data in the first storage device 20a is changed due to electro-magnetic disturbance while the power supply is interrupted and accordingly content of the software data (A) 21 is changed, for example, it is necessary to execute compensation processing of step S35 and subsequent steps.

If the substitute software data is found in the first storage device 20a at step S36, the software data selector 12 in the main controller 11 confirms that the found software data is not changed from its initial state ('NO' as a result of step S37 in FIG. 4), and then informs the main controller 11 that this software data is used for starting the execution of the start-up processing. Thus, the selection operation is completed (step S39 in FIG. 4).

If no initial-state software data is found at step S36, the software data selector 12 in the main controller 11 replaces any of the software data in the first storage device 20a with the initial-state software data (C) 31 to be stored in the second storage device 30a which is already checked at step S32, and then executes the start-up processing by using the replaced software data (step S38 in FIG. 4). In most cases, the second storage device 30a is configured by the non-volatile memory 30 which offers a data transfer rate lower than that offered by the first storage device 20a, and so it takes long time to transfer software data from the second storage device 30a to the first storage device 20a.

After the software data to be used for starting the execution of the start-up processing is thus selected at step S3 in FIG. 3, the main controller 11 starts the start-up processing for receiving a broadcast in the broadcast receiving apparatus 1 (step S4 in FIG. 3). Because the selected software data is stored in the first storage device 20a which offers a data transfer rate higher than the second storage device 30a and the selected software data can be directly read from and written to the first storage device 20a by the main controller 11, it is not necessary to perform transfer processing of the software data before the execution of the start-up processing is started, and the main controller 11 can promptly start the execution of the start-up processing by using the software data. After the main controller 11 performs initialization processing of the hardware devices necessary for the broadcast receiving apparatus 1 in FIG. 1, such as the tuner 51, the descrambler 52, the video information decoder 54 and the like, the main controller 11 starts their functions, selects a desired broadcast station, and outputs signals for providing the user with video information, audio information and the like from the signal output device 60.

Next, the main controller 11 executes processing of step S5 and subsequent steps in FIG. 3, while the execution of the start-up processing of step S4 is started or after displaying video of digital broadcast signal is started and the start-up processing is completed. Because the main controller 11 has limited processing ability, if processing for receiving a broadcast and the processing of step S5 and subsequent steps are executed at the same time, time assigned to the processing for receiving a broadcast out of processing time of the main controller 11 is reduced. As a result, in some cases, the start-up processing time (wait time) required until video of digital broadcast signal can be displayed is long. For this reason, the main controller 11 starts the processing of step S5 and subsequent steps at a proper time so as to reduce influence on the start-up processing time to the utmost.

The main controller 11 searches software data stored in the first storage device 20a (step S5 in FIG. 3). The main controller 11 excludes the software data (A) 21 used for starting the execution of the start-up processing and searches software data to determine whether or not the first storage device 20a stores software data other than the software data (A) 21. When the main controller 11 identifies which software data is used for starting the execution of the start-up processing of step S3, if the processing of step S35 and subsequent steps in FIG. 4 has been performed to search software data in the first storage device 20a, the main controller 11 may use a result of the search at step S5 in FIG. 3.

Then, if the execution-targeted software data is found ('YES' as a result of step S6 in FIG. 3), the software data change determiner 13 in the main controller 11 determines whether or not the execution-targeted software data (B) 22 is changed from its initial state (step S7 in FIG. 3).

If the main controller 11 determines at step S7 that the software data (B) 22 is changed, the main controller 11 replaces the software data (B) 22 with the initial-state software data (C) 31 to be stored in the second storage device 30a (step S8 in FIG. 3), and then searches for other software data again at step S5. If the main controller 11 determines at step S7 that there is no change from its initial state, the main controller 11 searches for other software data again at step S5.

When the search for the software data to be stored in the first storage device 20a is finished ('NO' as a result of step S6 in FIG. 3), the main controller 11 changes software data to be used for starting the execution of the start-up processing (step S9 in FIG. 3). It is probable that the software data (A) 21, which is used for starting the execution of the start-up processing at step S4, out of the software data stored in the first storage device 20a, is changed from its initial state according to operation of the main controller 11, after the execution of the start-up processing of step S4 is started. Because all of the software data except the software data (A) 21 are initial-state software data, the main controller 11 selects one from the software data other than the software data (A) 21. If no software data other than the software data (A) 21 to be used for starting the execution of the start-up processing is found in the first storage device 20a, the main controller 11 transfers the initial-state software data (C) 31 to be stored in the second storage device 30a to the first storage device 20a, as the software data (B) 22, and then selects the software data (B) 22 at the time of the next start-up processing. The main controller 11 stores storage information indicating where the selected software data (B) 22 is stored, a size of the selected software data (B) 22, when the storage information is changed and the like so that the storage information can be read at steps S32 and S33. After step S9 is completed, the main controller 11 terminates the start-up processing.

At step S9 in FIG. 3, the main controller 11 stores information that the software data (B) 22 is used at the time of the next start-up processing. At steps S36 and S37 in FIG. 4, the software data (B) 22 is the initial-state software data. The software data (B) 22 is stored in the first storage device 20a which offers a high data transfer rate and the software data (B) 22 can be directly be read from and written to the first storage device 20a by the main controller 11. For this reason, it can be normally started up at the time of the next start-up processing using the software data (B) 22 in the first storage device 20a. At this time, the transfer processing of the software data from the second storage device 30a configured by the non-volatile backup memory 30 offering a low data transfer rate, or the like is not performed, and so the start-up processing time can be reduced in comparison with the start-up processing including the transfer processing of the software data. Moreover, after the execution of the start-up processing of step S4 is started by using the software data (B) 22, storage information is changed until step S9 to use the software data (A) 21 as software data to be used at the time of the next start-up processing. For this reason, if the start-up processing up to step S9 is executed, it is possible to obtain an effect that the start-up processing time is shortened each time even if the power of the apparatus is repeatedly turned off and turned on.

During the start-up processing using the software data (A) 21, even if the power of the apparatus is interrupted before the start-up processing up to step S9 in FIG. 3 is executed and neither the software data (A) 21 nor the software data (B) 22 are in their initial states, the main controller 11 replaces the initial-state software data (C) 31 with the software data (A) 21 in the first storage device 20a by overwriting and starts the execution of the start-up processing by using the software data (A) 21, at step S38 in FIG. 4. Then, at step S9 in FIG. 3, the main controller 11 replaces the initial-state software data (C) 31 in the second storage device 30a with the software data (B) 22 in the first storage device 20a by overwriting as software data to be used at the time of the next start-up processing, and stores information that the software data (B) 22 is used for starting the execution of the start-up processing. Thus, the start-up processing time can be also reduced at the time of the next start-up processing. Although a case where longer start-up processing time by a period of time of data transfer is required may occur when the start-up processing is executed, such case will occur at one time at the utmost. In general, it is possible to reduce the start-up processing time in a normal use.

Even in an initial state such as a factory default state of the broadcast receiving apparatus 1 and the like where only the second storage device 30a stores the software data (C) 31 and the first storage device 20a stores no software data, the transfer processing of the software data to the first storage device 20a is performed as described above, and then the start-up processing time can be reduced at the time of the next and subsequent start-up processing.

Executing the start-up processing by the main controller 11 in the broadcast receiving apparatus 1 thus configured enables the start-up processing to be executed so as to reduce the start-up processing time at the time of the next start-up processing, even if the power of the apparatus is unintentionally interrupted while the broadcast receiving apparatus 1 is in the middle of the start-up processing. Even in an abnormal case where the power of the apparatus 1 is turned off and turned on in a short time, recovery processing is performed at the time of the next start-up processing, and then the start-up processing time can be reduced at the time of the start-up processing at the next start-up processing in the same manner. Thus, the start-up processing time of the broadcast receiving apparatus 1 can be reduced and user's convenience can be improved.

In the above explanation, control by the main controller 11 is described by attention to the starting of the execution of the start-up processing for the broadcast receiving apparatus 1.

However, it is not limited to the control by the main controller 11 at the time of the starting of the execution of the start-up processing, and the configuration described above can be also applied to starting of execution of a specific processing during operation. In such cases, an effect based on the configuration can be expected.

Moreover, in the above explanation, software start-up processing is described by attention to the broadcast receiving apparatus 1. However, the present invention can be also applied to software start-up processing in an apparatus other than the broadcast receiving apparatus 1.

Furthermore, in the above explanation, in the broadcast receiving apparatus 1, a point of time when software start-up processing is completed is defined as a point of time when the video information and the audio information can be provided to the user after a broadcast is received. However, in an apparatus other than the broadcast receiving apparatus 1, by defining a point of time when the start-up processing is completed in consideration of characteristics of the apparatus, specifying a function necessary for the completion of the start-up processing, selecting software necessary for the completion of the start-up processing, and then starting the software according to the software start-up processing described above in the same manner, time required until the completion of the start-up processing can be reduced, even if the power supply is unintentionally interrupted while the apparatus is under operating conditions.

Second Embodiment

Figure 5:
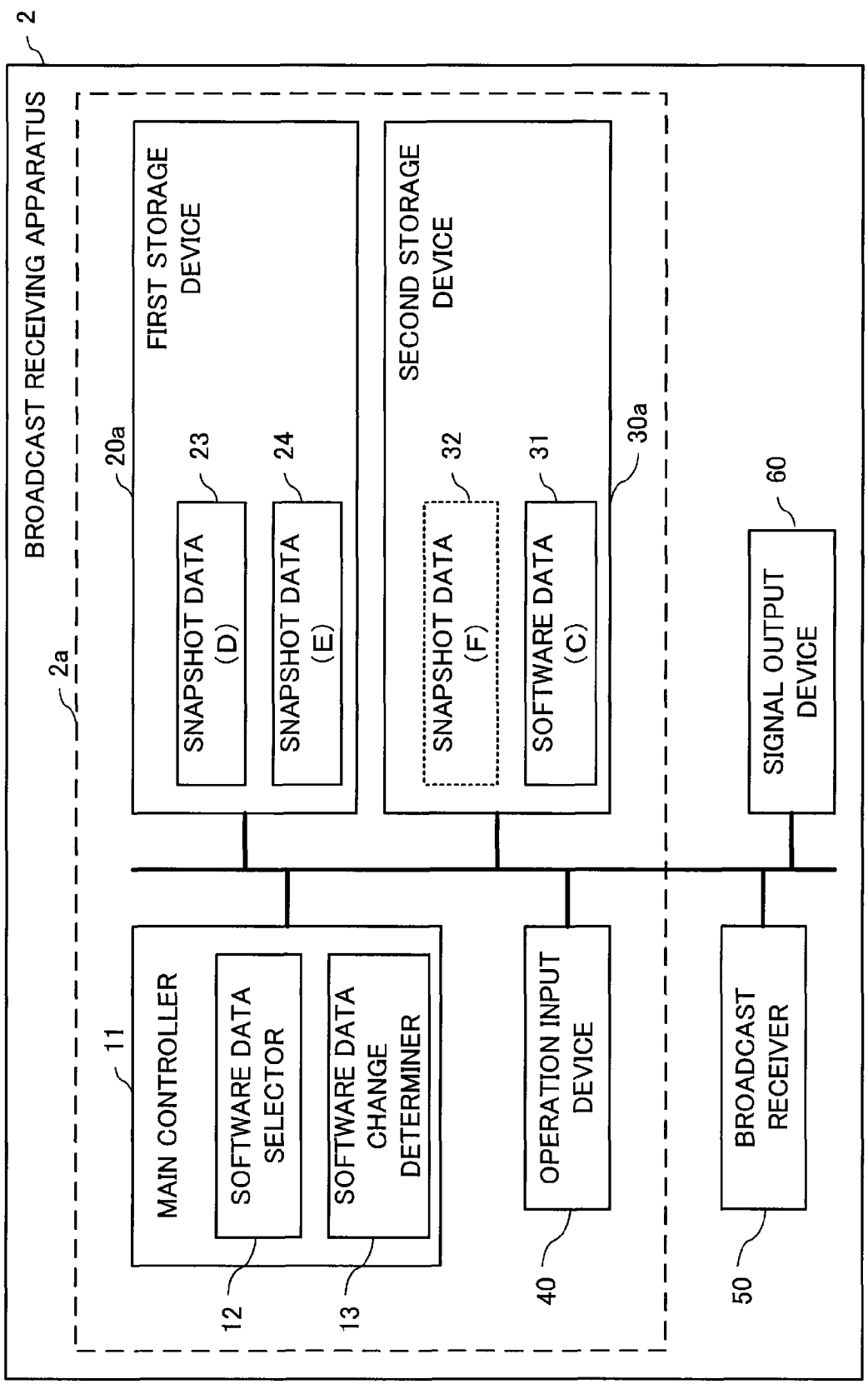
FIG. 5 is a simplified block diagram schematically illustrating a broadcast receiving apparatus including an information processing apparatus according to a second embodiment of the present invention.

FIG. 5 is a simplified block diagram schematically illustrating a specific example of a configuration of a broadcast receiving apparatus 2 according to a second embodiment of the present invention. Constituent elements in FIG. 5 that are the same as or correspond to those in FIG. 2 are assigned the same reference characters as in FIG. 2. In the configuration of the broadcast receiving apparatus 2, the main controller 11, the first storage device 20*a*, the second storage device 30*a* and the operation input device 40 constitute an information processing apparatus 2*a* according to the second embodiment. As illustrated in FIG. 5, although the broadcast receiving apparatus 2 according to the second embodiment has a similar configuration to that of the broadcast receiving apparatus 1 according to the first embodiment, software data stored in the first storage device 20*a* and the second storage device 30*a* are different from those in the first embodiment. In FIG. 5, the first storage device 20*a* stores snapshot data (D) 23 and snapshot data (E) 24 as software data; and the second storage device 30*a* stores software data (C) 31 like in the first embodiment. Furthermore, snapshot data (F) 32 is data generated based on the software data (C) 31.

The term 'snapshot data' indicates 'data to be used during the execution of the start-up processing' which is stored in the first storage device 20*a*, after the execution of the start-up processing for the broadcast receiving apparatus 2 is started and then given initialization processing is completed by using the initial-state software data (C) 31 stored in the second storage device 30*a*. When the start-up processing is performed by using the snapshot data stored in the first storage device 20*a*, the main controller 11 executes minimum necessary recovery processing only, instead of the execution of the given initialization processing. For this reason, time until software initialization processing is completed can be shortened and accordingly the start-up processing time for the broadcast receiving apparatus 2 can be shortened. However, in some cases, regarding software exclusively for a hardware device in the broadcast receiving apparatus 2, such as the tuner 51, the video information decoder 54 and the like, the main controller 11 does not perform initialization processing therefor, and the hardware device performs the initialization processing according to operation of the hardware device after the power of the apparatus 2 is turned on. For such software exclusively for hardware devices, it is necessary to use initial-state software for which no initialization processing has been performed. The software exclusively for hardware devices, together with snapshot data for software for the main controller 11, are referred to as snapshot data for the whole of the broadcast receiving apparatus 2.

Figure 6:
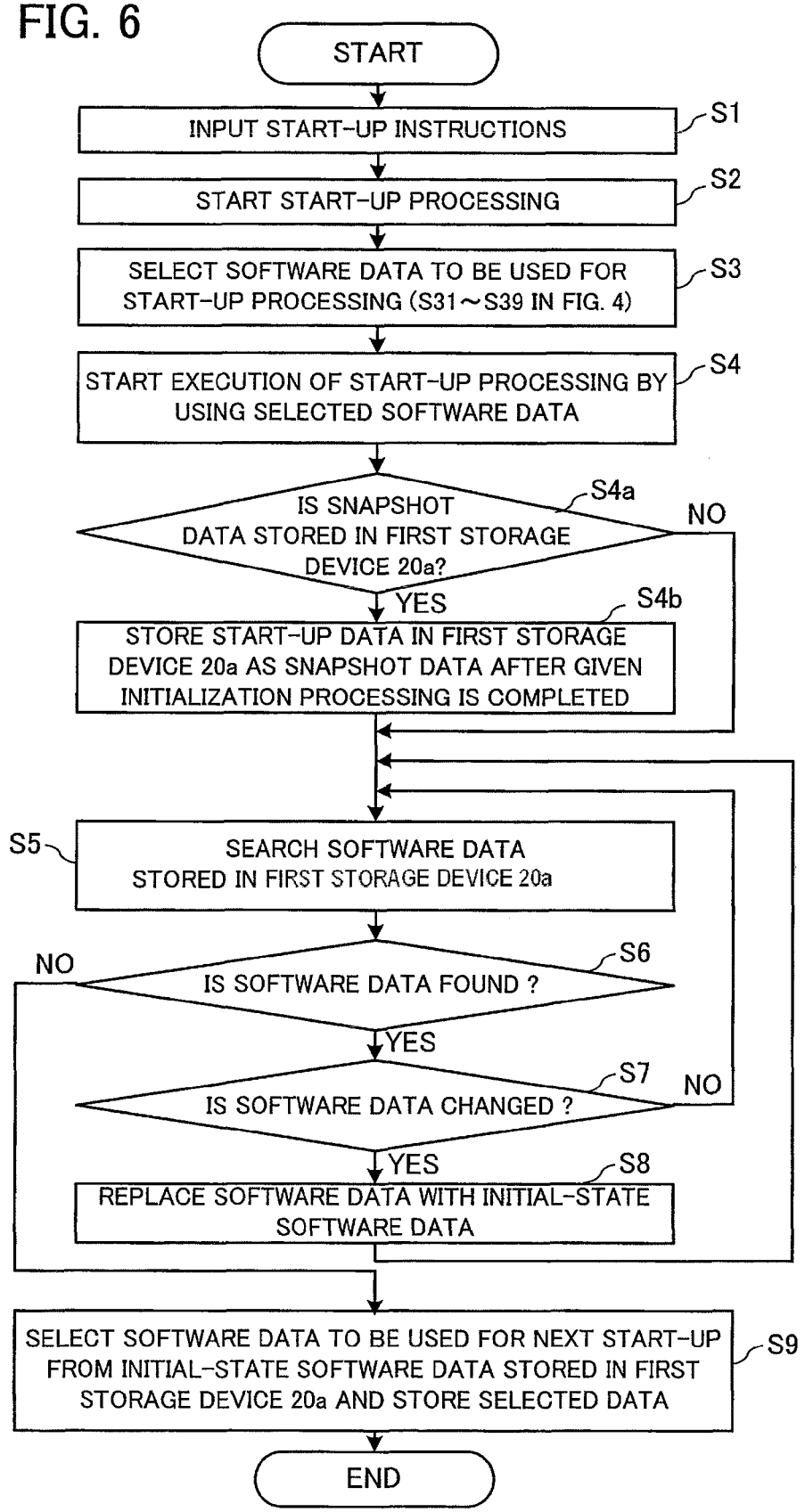
FIG. 6 is a flowchart illustrating start-up processing of a main controller in the broadcast receiving apparatus according to the second embodiment (a software start-up method according to the second embodiment)

FIG. 6 is a flowchart illustrating the start-up processing of the main controller 11 in the broadcast receiving apparatus 2 according to the second embodiment (a software start-up method according to the second embodiment). Step numbers in FIG. 6 that are the same as those in FIG. 3 indicate the same or corresponding steps. When the broadcast receiving apparatus 2 is in an initial state such as a factory default state where the first storage device 20*a* stores no snapshot data, the start-up processing is sometimes started by using software data obtained as a result of a transfer of the initial-state software data (C) 31 in the second storage device 30*a* to the first storage device 20*a* at step S3 in FIG. 6. Here, an example where the snapshot data (D) 23 is selected will be explained.

After processing of steps S1 to S3 in FIG. 6, the main controller 11 starts the execution of the start-up processing at step S4 in FIG. 6 by using the snapshot data (D) 23, for example. Here, a case where the snapshot data (D) 23 is 'data to be used during the execution of the start-up processing' in a state where the start-up processing is started by using the initial-state software data (C) 31, the given initialization processing is completed, and then recovery preparation processing is performed so that recovery processing can be performed will be explained. Accordingly, after the main controller 11 starts the execution of the start-up processing by using the snapshot data (D) 23 and then a desired recovery processing is performed, it becomes the same state as that when the main controller 11 starts the execution of the start-up processing by using the initial-state software data (C) 31 and then the given initialization processing is completed. Then, the main controller 11 performs remaining processing for receiving a broadcast, and performs processing for selecting a desired broadcast station and providing a user with video information, audio information and the other information.

Next, after starting the execution of the start-up processing at step S4 in FIG. 6, the main controller 11 checks whether or not the first storage device 20*a* stores snapshot data (step S4*a* in FIG. 6). Then, if the first storage device 20*a* stores no snapshot data, i.e., if the execution of step S4 is started based on the software data obtained as a result of a transfer of the initial-state software data (C) 31 in the second storage device 30*a* to the first storage device 20*a*, 'data to be used during the execution of the start-up processing' in the first storage device 20*a* is newly stored in the second storage device 30*a* as the snapshot data (F) 32 (step S4*b* in FIG. 6), after the given initialization processing is completed. If the start-up processing is started at step S4 by using any of the snapshot data, the main controller 11 skips the processing of step S4*b* and proceeds the processing to step S5.

Processing of step S5 and subsequent steps in FIG. 6 is the same as corresponding processing in FIG. 3 (the first embodiment), except that snapshot data is substituted for initial-state software data as data for the next start-up processing. In the second embodiment, the snapshot data (D) 23 is substituted for the software data (A) 21 in the first storage device 20*a* in the first embodiment, the snapshot data (E) 24 is substituted for the software data (B) 22, and the snapshot data (F) 32 is substituted for the software data (C) 31 in the second storage device 30a. In other words, in the second embodiment, when it is started up by using the snapshot data (D) 23, information which specifies snapshot data to be used for starting the execution of the next start-up processing (e.g., information indicating to start up by using the snapshot data (E) 24) is stored.

In the broadcast receiving apparatus 2 according to the second embodiment thus configured, as in the apparatus 1 in the first embodiment, even if the power of the apparatus 2 is unintentionally interrupted while the broadcast receiving apparatus 2 is under operating conditions, the start-up processing can be executed at the time of the next start-up processing so that the start-up processing time is shortened. Moreover, even if an abnormal state occurs, e.g., if the power of the apparatus 2 is turned off and turned on in a short time, recovery processing is performed by using the snapshot data (F) 32 or the initial-state software data (C) 31 at the time of the next start-up processing of the apparatus 2, and then the start-up processing time can be shortened at the time of the start-up processing after the next start-up processing in the same manner. Furthermore, in the second embodiment, in contrast with the first embodiment, time is required for only the recovery processing instead of the given initialization processing executed at the time of the start-up processing using the initial-state software data, and time until the initialization processing is completed is shortened. For this reason, time from turning on the power to the apparatus 2 until video of digital broadcast signal can be displayed (the start-up processing time of the broadcast receiving apparatus 2) can be further reduced.

Moreover, the software exclusively for hardware devices other than software executed on the main controller 11 in the broadcast receiving apparatus 2 are stored in the first storage device 20a offering a high data transfer rate, instead of in the second storage device 30a which is configured by the non-volatile backup memory 30 or the like which offers a low data transfer rate. For this reason, the start-up processing can be executed without performing the transfer processing from the second storage device 30a to the first storage device 20a. Furthermore, even if the power of the apparatus 2 is repeatedly turned on, the start-up processing can be started by using initial-state software exclusively for hardware devices and initialization processing can be completed in a short time without including time for the transfer processing of the software data for every hardware devices.

As described above, in the broadcast receiving apparatus 2 according to the second embodiment, even if the software exclusively for hardware devices other than software executed on the main controller 11 is also stored in the first storage device 20a, the start-up processing time can be further reduced and user's convenience can be remarkably improved.

The second embodiment described above is an example where the broadcast receiving apparatus 2 is configured so that the initial-state software data (C) 31 is stored in the second storage device 30a and start up is executed by using the initial-state software data (C) 31 at the time of first start-up processing, and after the given initialization processing is completed, the snapshot data (F) 32 is stored in the second storage device 30a, and the next and successive start-up processing is executed by using the snapshot data (F) 32. However, it may be configured so that processing of generating the snapshot data (F) 32 from the initial-state software data (C) 31 is performed in advance to store in the second storage device 30a, and the second storage device 30a does not store the initial-state software data (C) 31. In a case of this configuration, the broadcast receiving apparatus 2 can be configured by the first storage device 20a with a small storage capacity, besides processing of steps S4a and S4b in FIG. 6 needs not be performed, and thus the start-up processing time can be further reduced.

Third Embodiment

Figure 7:
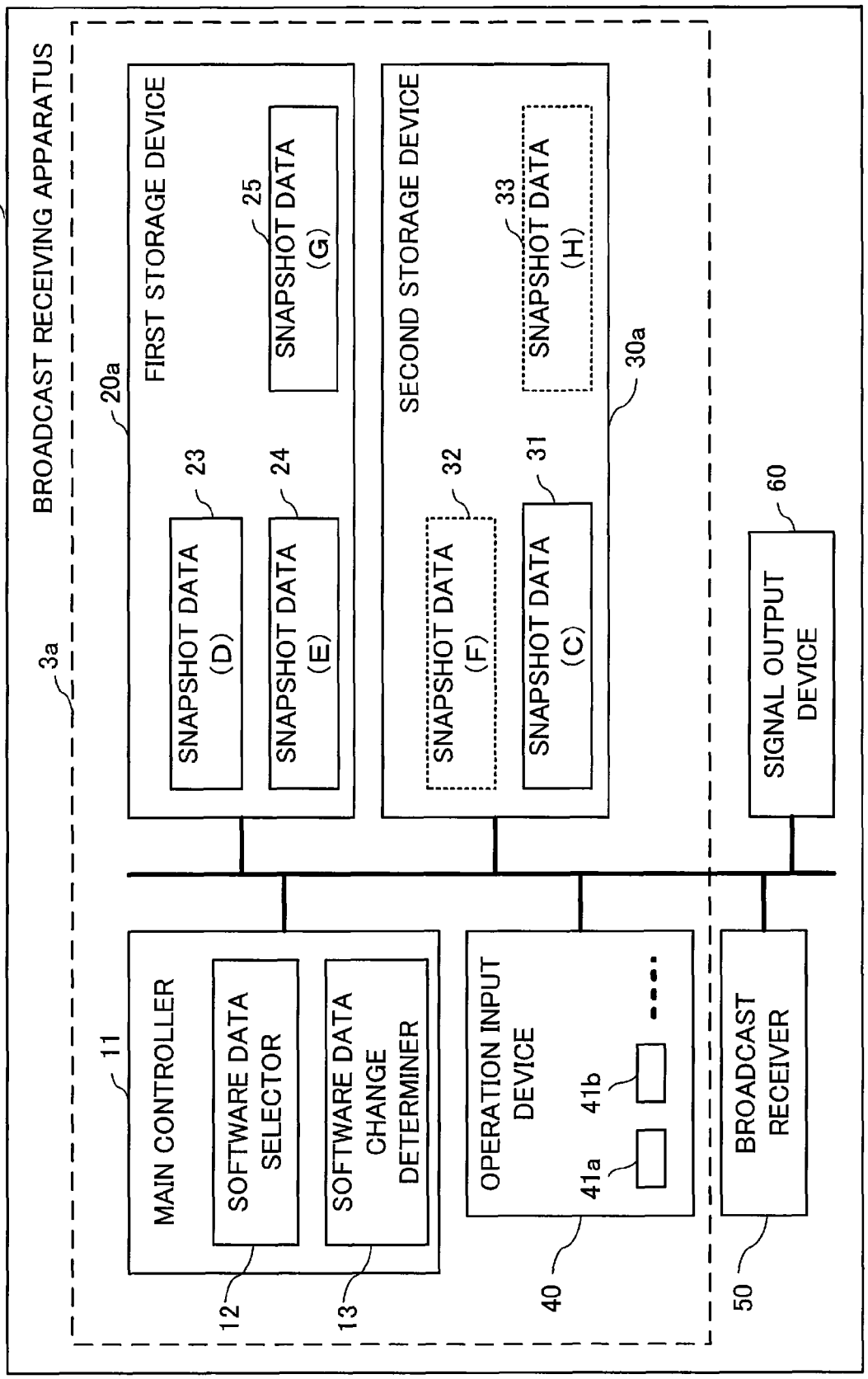
FIG. 7 is a simplified block diagram schematically illustrating a broadcast receiving apparatus including an information processing apparatus according to a third embodiment of the present invention.

FIG. 7 is a simplified block diagram schematically illustrating a specific example of a configuration of a broadcast receiving apparatus 3 according to a third embodiment of the present invention. Constituent elements in FIG. 7 that are the same as or correspond to those in FIG. 5 are assigned the same reference characters as in FIG. 5. In the configuration of the broadcast receiving apparatus 3, the main controller 11, the first storage device 20a, the second storage device 30a and the operation input device 40 constitute an information processing apparatus 3a according to the third embodiment.

As illustrated in FIG. 7, the broadcast receiving apparatus 3 according to the third embodiment differs from the broadcast receiving apparatus 2 according to the second embodiment in a point that the first storage device 20a stores snapshot data. (G) 25 and the second storage device 30a stores snapshot data (H) 33. As described in the second embodiment, the snapshot data (D) 23, the snapshot data (E) 24 and the snapshot data (F) 32 are 'data to be used during the execution of the start-up processing' in a state where given initialization processing necessary for receiving a broadcast and providing video and audio is completed. However, the snapshot data (G) 25 and the snapshot data (H) 33 are snapshot data generated from 'data to be used during the execution of the start-up processing' in a state where the execution of the start-up processing is started by using the initial-state software data (C) 31, and then the given initialization processing necessary for presenting an electronic program guide and enabling user operation by using the electronic program guide is completed.

In the third embodiment, the operation input device 40 includes operation buttons for carrying out various functions, such as an operation button 41a for turning on the power, an operation button 41b of electronic program guide for displaying an electronic program guide, and the like. When the user operates both of the operation button 41a for turning on the power and the operation button 41b of electronic program guide or when the user operates only the operation button 41b for electronic program guide and the main controller 11 determines that the user wishes to firstly watch the electronic program guide at the time of turning on the power of the broadcast receiving apparatus 3, the main controller 11 instructs the software data selector 12 to select software data which is used at the time of the start-up processing so that the instruction contains additional information, i.e., information that the user wishes to watch the electronic program guide. The software data selector 12 presents the electronic program guide which is capable of firstly starting a wished function, determines presence or absence of snapshot data for which given initialization processing necessary for enabling user operation is completed, and informs the main controller 11 that the snapshot data (G) 25 which is searched out as a result of the search is used at the time of the start-up processing.

The main controller 11 executes the start-up processing of the apparatus 3 by using the snapshot data (G) 25, and then prepares snapshot data which is possibly used at the time of the next start-up processing. At that time, the main controller 11 replaces (i.e., updates or overwrites) the snapshot data (E) 24 which is one of snapshot data for receiving a broadcast with the snapshot data (H) 33 which is stored in the second storage device 30a and accompanied by data of the electronic program guide. Accordingly, at the time of the next start-up processing, if the user operates the operation button 41a for turning on the power of the apparatus 3 only, the apparatus 3 is started up by using the snapshot data (D) 23 for receiving a broadcast; and if the user operates the operation button 41b for the electronic program guide, any function can be firstly started up by using the snapshot data (E) 24 including updated data of the electronic program guide. Moreover, even if the power to the broadcast receiving apparatus 3 is repeatedly turned off and turned on, because the snapshot data for various uses which can be used at the time of the next start-up processing are prepared as described above, the start-up processing time can be reduced at any time and for any function.

In the broadcast receiving apparatus 3 according to the third embodiment, regarding the snapshot data relating to presenting the electronic program guide which is stored in the first storage device 20a, it is required to provide information on broadcast programs and to update the information as time passes. For this reason, it is required to update the snapshot data for the electronic program guide at a proper time while the broadcast receiving apparatus 3 is in operation.

Thus, by selecting a function which is started at the time of the start-up processing in response to user operation and starting the start-up processing of the user-intended function, received broadcast video and audio can be firstly provided to the user out of functions of the broadcast receiving apparatus 3, and besides the electronic program guide function can be firstly provided rather than the broadcast receiving function, if the user operates with the intention of using the electronic program guide at the time of the start-up processing. Therefore, user's convenience can be improved.

Moreover, in the broadcast receiving apparatus 3 according to the third embodiment, by attention to the function regarding providing received broadcast and the function regarding presenting an electronic program guide out of functions of the broadcast receiving apparatus 3, it is configured so as to store two kinds of snapshot data in the first storage device 20a. If it is configured to produce and store snapshot data corresponding to other functions of the broadcast receiving apparatus 3 in the same manner, it is possible to reduce the start-up processing time until various functions of the broadcast receiving apparatus 3 are started from when the power of the apparatus is turned on. Therefore, user's convenience can be further improved.

Furthermore, in the broadcast receiving apparatuses 1, 2 and 3 according to the first, second and third embodiment respectively, instead of using an originally non-volatile storage device such as an MRAM as the non-volatile RAM 20 which configures the first storage device 20a, the same effect can be obtained by using a volatile RAM together with an auxiliary power source as a non-volatile storage device. Here, the auxiliary power source is not limited to the power supply capable of supplying power without an external power supply such as a storage battery and a capacitor. Further, the auxiliary power source may be an auxiliary power supply device which supplies only small power to the volatile RAM in a main power supply device which needs an external power supply. However, in such a case where the volatile RAM and the auxiliary power source are used as the non-volatile storage device, if the auxiliary power source loses power supply ability, electronic data stored in the volatile RAM is lost. For this reason, it is necessary to configure the second storage device 30a by a storage device capable of holding electronic data even when power supply is interrupted (such as a non-volatile memory), unlike the first storage device 20a.

In addition, some volatile RAMS require processing for starting a function of preventing electronic data stored therein from being lost while low power consumption is maintained. When the power supply to the broadcast receiving apparatus 1, 2 or 3 is unintentionally interrupted, it is sometimes necessary that the main controller 11 control such processing by using an auxiliary power source. Thus, in a case where the first storage device 20a of the broadcast receiving apparatus 1, 2 or 3 is configured by a combination of the volatile RAM, the auxiliary power source and a non-volatile RAM or the like, the configuration need not include the non-volatile RAM 20 which is expensive and there is an advantage that costs can be remarkably reduced in comparison with a case where it is configured by only the non-volatile RAM 20.

Fourth Embodiment

Figure 8:
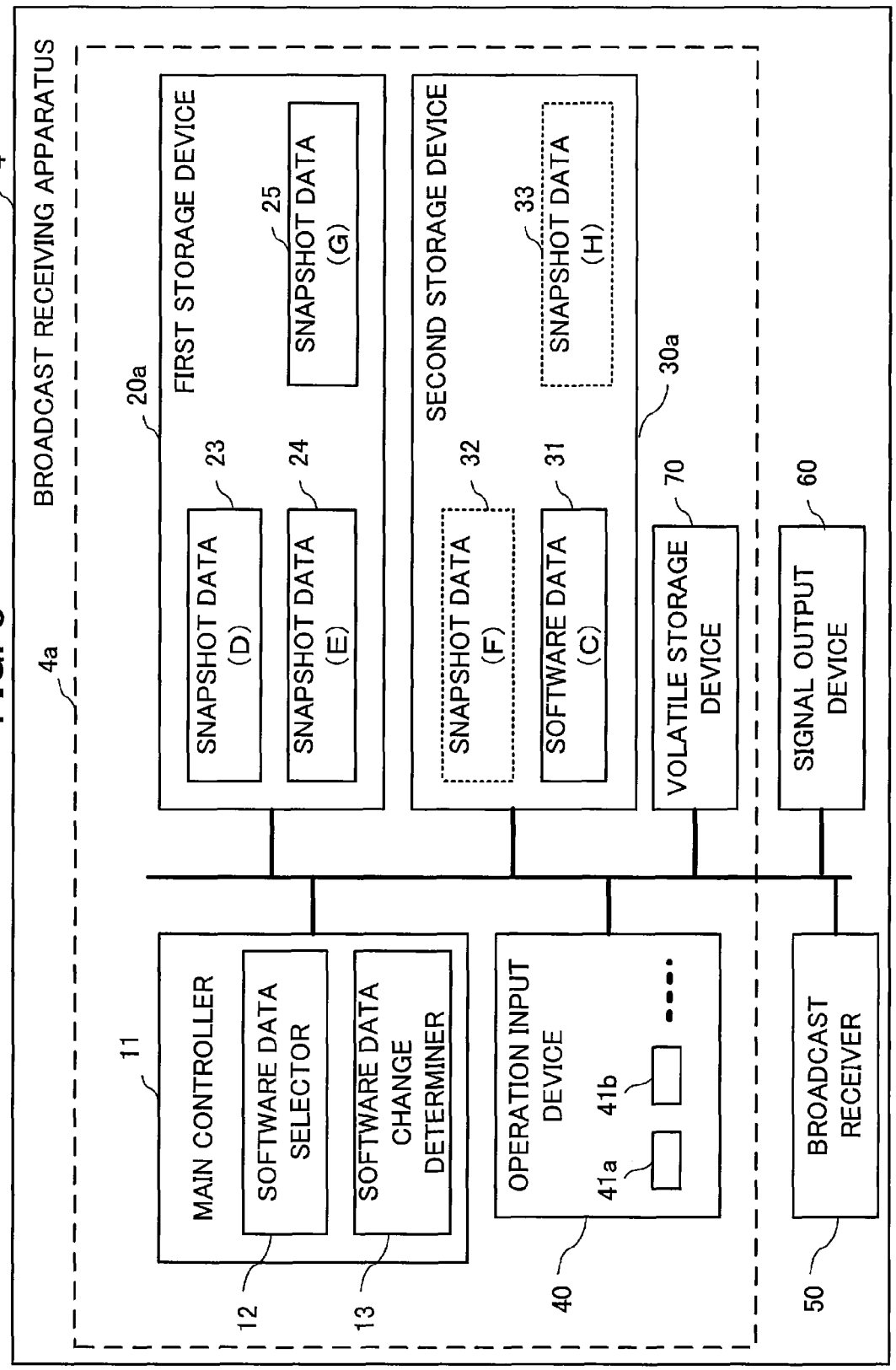
FIG. 8 is a simplified block diagram schematically illustrating a broadcast receiving apparatus including an information processing apparatus according to a fourth embodiment of the present invention.

FIG. 8 is a simplified block diagram schematically illustrating a specific example of a configuration of a broadcast receiving apparatus 4 according to a fourth embodiment of the present invention. Constituent elements in FIG. 8 that are the same as or correspond to those in FIG. 7 are assigned the same reference characters as in FIG. 7. In the configuration of the broadcast receiving apparatus 4, the main controller 11, the first storage device 20a, the second storage device 30a, the operation input device 40 and a volatile storage device 70 constitute an information processing apparatus 4a according to the fourth embodiment.

As illustrated in FIG. 8, the broadcast receiving apparatus 4 according to the fourth embodiment differs from the broadcast receiving apparatus 3 according to the third embodiment in a point that the broadcast receiving apparatus 4 includes the volatile storage device 70. Like the non-volatile RAM 20 which configures the first storage device 20a, the volatile storage device 70 is a storage device which offers a data transfer rate higher than the non-volatile backup memory 30. However, if the power supply is stopped by interruption of the power of the apparatus 4, the volatile storage device 70 cannot hold electronic data being stored. Meanwhile, the volatile storage device 70 is a low-cost device with a large storage capacity in comparison with the non-volatile RAM 20 which configures the first storage device 20a. For this reason, the main controller 11 controls operation of the first storage device 20a and the volatile storage device 70 so that the first storage device 20a stores data which is necessary for performing the start-up processing at high speed as in the first, second or third embodiment and the volatile storage device 70 stores data which need not be held. Therefore, it is possible to provide the broadcast receiving apparatus 4 at low cost while an ability to complete the start-up processing in a short time is maintained.

Except for the points described above, the fourth embodiment is the same as the third embodiment.

Furthermore, the volatile storage device 70 in the fourth embodiment can be applied to the first or second embodiment.

Although the first to fourth embodiments describe the broadcast receiving apparatuses as examples, the present invention can be also applied to a digital broadcast receiving apparatus, an optical disc recording/reproducing apparatus, a hard disk recording/reproducing apparatus, a TV receiver, a personal computer, a mobile information terminal apparatus such as a cellular phone, or the like, which includes a configuration of the information processing device or the broadcast receiving apparatus according to any of the first to fourth embodiments.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. An information processing apparatus comprising:
a first storage device as a non-volatile storage device being capable of storing a plurality of items of software data to be used when execution of start-up processing of the apparatus is started, the plurality of items of software data being capable of being read from and written in the first storage device;
a second storage device as a non-volatile storage device offering a second data transfer rate not higher than a first data transfer rate offered by the first storage device, the second storage device storing at least one of the plurality of items of software data;
an operation input device; and
a main controller controlling operation of the first storage device and the second storage device, the main controller including a software data selector which selects any of the plurality of items of software data and a software data change determiner which determines whether or not there is a change in the plurality of items of software data;
wherein, according to instructions sent from the operation input device,
the software data selector selects execution-targeted software data which is used for starting the execution of the start-up processing, out of the plurality of items of software data stored in the first storage device,
the main controller starts the execution of the start-up processing by using the execution-targeted software data,
the software data selector searches for another software data other than the execution-targeted software data which has been used for the starting of the execution of the start-up processing, from the plurality of items of software data stored in the first storage device,
the software data change determiner determines whether or not the another software data which has been searched out as a result of the searching is changed from an initial-state of the another software data, and
if the another software data is changed from the initial-state software data, the software data selector selects initial-state software data as the initial state of the another software data from said at least one software data stored in the second storage device, reads the initial-state software data from the second storage device, and replaces the another software data stored in the first storage device with the read initial-state software data by overwriting.

2. The information processing apparatus according to claim 1,
wherein the main controller performs, after the information processing apparatus finished the execution of the start-up processing, the determination whether or not software data other than the execution-targeted software data is changed in the first storage device from the initial state and the replacing of the another software data with the read initial-state software data so as to be able to use the read initial-state software data when execution of next start-up processing is started.

3. The information processing apparatus according to claim 1, wherein:
the first storage device and the second storage device are separate storage units, and
the data transfer rate offered by the second storage device is lower than the data transfer rate offered by the first storage device.

4. The information processing apparatus according to claim 1, wherein:
the first storage device and the second storage device are separate storage regions in a same storage unit, and
the data transfer rate offered by the second storage device is equal to the data transfer rate offered by the first storage device.

5. The information processing apparatus according to claim 1, wherein the software data held by the first storage device is snapshot data which is stored in the first storage device after given processing is executed after the start-up processing.

6. The information processing apparatus according to claim 1, wherein:
the operation input device includes a plurality of operation buttons, and
the main controller selects software data corresponding to an operated operation button out of the plurality of operation buttons, as the execution-targeted software data, from the first storage device.

7. The information processing apparatus according to claim 1, further comprising a volatile storage device, wherein:
the main controller stores the software data necessary for the starting of the execution the start-up processing in the first storage device and the second storage device, and
the main controller stores another software data other than the software data necessary for the starting of the execution of the start-up processing in the volatile storage device.

8. A broadcast receiving apparatus comprising:
a broadcast receiver receiving and processing a broadcast signal; and
the information processing apparatus according to claim 1;
wherein the main controller of the information processing apparatus controls the broadcast receiver.

9. A software start-up method for an apparatus including a first storage device as a non-volatile storage device being capable of storing a plurality of items of software data to be used when execution of start-up processing of the apparatus is started; and a second storage device as a non-volatile storage device offering a second data transfer rate not higher than a first data transfer rate offered by the first storage device, the second storage device storing at least one of the plurality of items of software data;
the method comprising the steps of:
selecting execution-targeted software data which is used for starting execution of the start-up processing, out of the plurality of items of software data stored in the first storage device;
starting the execution of the start-up processing by using the execution-targeted software data;
searching for another software data other than the execution-targeted software data which has been used for the starting of the execution of the start-up processing, from the plurality of items of software data stored in the first storage device;
determining whether or not the another software data which has been searched out as a result of the searching is changed from an initial-state of the another software data; and if the another software data is changed from the initial-state software data, selecting initial-state software data as the initial state of the another software data from said at least one software data stored in the second storage device, reading the initial-state software data from the second storage device, and replacing the another software data stored in the first storage device with the read initial-state software data by overwriting.

10. The method according to claim 9, wherein after start-up processing is executed, in the first storage device, the step of determining whether or not software data other than the execution-targeted software data is changed from the initial state and the step of replacing the another software data stored in the first storage device with the read initial-state software data by overwriting are performed so as to be able to use the read initial-state software data when execution of next start-up processing is started.

11. The method according to claim 9, wherein the software data held by the first storage device is snapshot data which is stored in the first storage device after given processing is executed after the start-up processing.

12. The method according to claim 9, wherein in the step of selecting, software data corresponding to an operated operation button out of the plurality of operation buttons in an operation input device, is selected as the execution-targeted software data, from the first storage device.

* * * * *